United States Patent
Fujita et al.

(10) Patent No.: US 12,083,568 B2
(45) Date of Patent: Sep. 10, 2024

(54) PRODUCTION SPECIFICATION DETERMINATION METHOD, PRODUCTION METHOD, AND PRODUCTION SPECIFICATION DETERMINATION APPARATUS FOR METAL MATERIAL

(71) Applicant: JFE STEEL CORPORATION, Tokyo (JP)

(72) Inventors: Noriki Fujita, Tokyo (JP); Yukio Takashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 568 days.

(21) Appl. No.: 17/423,476

(22) PCT Filed: Feb. 19, 2019

(86) PCT No.: PCT/JP2019/006145
§ 371 (c)(1),
(2) Date: Jul. 16, 2021

(87) PCT Pub. No.: WO2020/148917
PCT Pub. Date: Jul. 23, 2020

(65) Prior Publication Data
US 2022/0072593 A1   Mar. 10, 2022

(30) Foreign Application Priority Data

Jan. 17, 2019   (JP) ................. 2019-006221

(51) Int. Cl.
*B21B 3/02*  (2006.01)
*G05B 19/4097*  (2006.01)

(52) U.S. Cl.
CPC ............ *B21B 3/02* (2013.01); *G05B 19/4097* (2013.01)

(58) Field of Classification Search
CPC .............................. B21B 3/02; G05B 19/4097
(Continued)

(56) References Cited

U.S. PATENT DOCUMENTS

| | | |
|---|---|---|
| 6,411,945 B1 | 6/2002 | Nakajima |
| 10,565,458 B2 | 2/2020 | Fukuhara et al. |

(Continued)

FOREIGN PATENT DOCUMENTS

| | | |
|---|---|---|
| CN | 106794499 A | 5/2017 |
| EP | 2787098 B1 | 9/2018 |

(Continued)

OTHER PUBLICATIONS

Feb. 4, 2022, the Extended European Search Report issued by the European Patent Office in the corresponding European Patent Application No. 19910457.1.

(Continued)

*Primary Examiner* — Md Azad
(74) *Attorney, Agent, or Firm* — KENJA IP LAW PC

(57) ABSTRACT

A production specification determination method, a production method, and a production specification determination apparatus that can increase robustness against disturbances during production of a metal material are provided. Included are the steps of acquiring at least one piece of performance data established after a predetermined process during production of a metal material, performing back analysis based on the at least one piece of performance data and a prediction model that relates production specifications and material characteristics, and searching for production specifications for after the predetermined process such that an estimated value for the material characteristics asymptotically approaches a desired value.

7 Claims, 8 Drawing Sheets

(58) Field of Classification Search
USPC .......................................................... 700/97
See application file for complete search history.

(56) References Cited

U.S. PATENT DOCUMENTS

| | | | |
|---|---|---|---|
| 2007/0208436 | A1 | 9/2007 | Das et al. |
| 2009/0193936 | A1 | 8/2009 | Lu et al. |
| 2012/0283861 | A1* | 11/2012 | Zwickl ................ G05B 19/404 |
| | | | 700/97 |
| 2017/0297072 | A1* | 10/2017 | Kuyama ................... G01N 3/08 |
| 2018/0081339 | A1 | 3/2018 | Zhu et al. |
| 2018/0246494 | A1 | 8/2018 | Nakahama |
| 2018/0341248 | A1 | 11/2018 | Mehr et al. |
| 2019/0271966 | A1* | 9/2019 | Coffman ................ B33Y 50/00 |
| 2019/0295827 | A1* | 9/2019 | Ohmori .............. G05B 19/4155 |
| 2020/0024712 | A1* | 1/2020 | Iwamura ................ B22D 2/006 |

FOREIGN PATENT DOCUMENTS

| | | |
|---|---|---|
| JP | H08240587 A | 9/1996 |
| JP | WO9806550 A1 | 1/1999 |
| JP | 2003268428 A | 9/2003 |
| JP | 4393586 B2 | 1/2010 |
| JP | 4476923 B2 | 6/2010 |
| JP | 4772932 B2 | 9/2011 |
| JP | 5953952 B2 | 7/2016 |
| JP | 2017199383 A | 11/2017 |
| JP | 2018060512 A | 4/2018 |
| JP | 2018138327 A | 9/2018 |
| JP | 2018169993 A | 11/2018 |
| WO | 2018062398 A1 | 4/2018 |

OTHER PUBLICATIONS

Dec. 16, 2022, Notification of reasons for revocation issued by the Japan Patent Office in the corresponding Japanese Patent No. 7056592 with English language concise statement of relevance.

Hiroyasu Shigemori, Quality Design and Quality Control of Steel Products using Local Regression Models, 2013 with a partial English translation.

JFE Technical Journal No. 33, Special Issue on Steel Plates, Feb. 2014, JFE Holdings, Inc. with a partial English translation.

Aug. 17, 2022, Office Action issued by the Korean Intellectual Property Office in the corresponding Korean Patent Application No. 10-2021-7024454 with English language concise statement of relevance.

Oct. 8, 2022, Office Action issued by the China National Intellectual Property Administration in the corresponding Chinese Patent Application No. 201980088469.6 with English language search report.

Sep. 7, 2021, Notification of Reasons for Refusal issued by the Japan Patent Office in the corresponding Japanese Patent Application No. 2019-006221 with English language concise statement of relevance.

Nov. 16, 2021, Official Decision of Refusal issued by the Japan Patent Office in the corresponding Japanese Patent Application No. 2019-006221 with English language concise statement of relevance.

Apr. 9, 2019, International Search Report issued in the International Patent Application No. PCT/JP2019/006145.

Hidetoshi Fujii, Application of Neural Network Analysis to Prediction of Materials Properties, Modeling and Simulation for Microstructure and Mechanical Properties Control of Steels, 2004, pp. 127-146 with a partial English translation.

Hiroyoshi Matsubara et al, Investigation of Metallurgical Factors in the Production of High Strength Steel Plate with High Toughness by Controlled Rolling, Tetsu-to-Hagane, 1972, pp. 1848-1860, vol. 58, Issue 13 with a partial English translation.

May 18, 2021, Notification of Reasons for Refusal issued by the Japan Patent Office in the corresponding Japanese Patent Application No. 2019-006221 with English language Concise Statement of Relevance.

Yoshitaka Adachi et al., High Dimensional Microstructure Data-driven Prediction of Stress-strain Curve of DP Steels by Primary Artificial Intelligence, Tetsu-to-Hagane, 2016, pp. 47-55, vol. 102, Issue 1 with a partial English translation.

Yoshitaka Adachi et al., Material Information General System for Machine Learning Support, Systems, Control and Information, 2017, pp. 188-193, vol. 61, Issue 5 with a partial English translation.

* cited by examiner

FIG. 7

| Explanatory variable | Search lower limit | Search upper limit | After back analysis | |
|---|---|---|---|---|
| Slab thickness | | | 252 | |
| Slab width | | | 2389 | |
| Slab length | | | 3102 | |
| Rolling thickness | 15 | 15 | 15 | |
| Rolling width | 2850 | 3150 | 2957 | |
| Rolling length | 33250 | 36750 | 33653 | |
| Heating furnace temperature | 1035 | 1265 | 1097 | |
| Rolling reduction at the time of controlled rolling | 52 | 78 | 65 | |
| Controlled rolling temperature | 902.5 | 997.5 | 908 | |
| Rolling finish temperature | 640 | 960 | 886 | Predicted maximum elongation 26.9% |
| Cooling rate | 2 | 30 | 3 | |
| C | | | 0.162 | |
| Si | | | 0.284 | |
| Mn | | | 1.302 | |
| P | | | 0.015 | |
| S | | | 0.003 | |
| Ni | | | 0.008 | |
| Cr | | | 0.023 | |
| Nb | | | 0.008 | |
| V | | | 0.003 | |
| Ti | | | 0.016 | |

PRODUCTION SPECIFICATION DETERMINATION METHOD, PRODUCTION METHOD, AND PRODUCTION SPECIFICATION DETERMINATION APPARATUS FOR METAL MATERIAL

CROSS-REFERENCE TO RELATED APPLICATION

The present application claims priority to Japanese Patent Application No. 2019-006221 filed on Jan. 17, 2019, the entire contents of which are incorporated herein by reference.

TECHNICAL FIELD

The present disclosure relates to a production method for a metal material, such as a steel material. In greater detail, the present disclosure relates to a production specification determination method for a metal material that achieves desired characteristics, a production method for producing a metal material with the production specifications determined by the method, and a production specification determination apparatus.

BACKGROUND

Elongated materials with increased strength and reduced thickness are more frequently being used as the steel material in structures such as ships, marine structures, bridges, buildings, tanks, and construction machinery to improve design efficiency of the structures and reduce the amount of steel material used. Such steel material is not only required to have excellent weldability and mechanical properties, including strength and toughness, but also to have excellent shock energy absorption to guarantee structural safety of the structure with respect to external forces.

For example, these requirements are becoming stricter for structures such as ships. The reason is that if the ship hull is damaged by a collision with another ship or due to running aground, the cargo, fuel, and the like may flow out and lead to damage such as marine pollution. Structural approaches such as a double structure in the ship hull are being used as techniques for keeping such damage to a minimum. Applying such a structure to an entire ship, however, is unrealistic in terms of operability and manufacturing costs. It is therefore desirable to provide the steel plates themselves for the ship hull with energy absorption to prevent destruction of the ship hull when the ship collides.

Patent literature (PTL) 1 discloses a steel material that increases uniform elongation and improves collision resistance by setting the volume fraction of the ferrite phase to 75% or more throughout in the plate thickness direction, the hardness to Hv 140 or more and 160 or less, the average grain size to 2 μm or more and 40 μm or less, and the proportion of the volume fraction of the ferrite phase in the plate thickness direction of the surface layer part to 0.925 or more and 1.000 or less relative to the volume fraction of the ferrite phase in the plate thickness direction of the central part.

PTL 2 discloses a steel plate that has improved collision energy absorption by performing accelerated cooling after rolling to a cumulative rolling reduction of 30% to 98% in the austenite single phase region and subsequently performing air cooling or a tempering process to obtain a steel plate such that the area ratio of ferrite is 85% or more, the average grain size of ferrite is 5 μm to 40 μm, and the number density of cementite particles within ferrite grains is 50000 per mm$^2$ or less.

PTL 3 discloses a steel material with improved collision absorption obtained by performing accelerated cooling after final pass rolling (finish rolling) and then reheating at a constant temperature and performing accelerated cooling again to control the stacking factor, average grain size, and maximum grain size of the ferrite, along with the size of the secondary phase.

Automatic material design has also been proposed. For example, PTL 4 proposes a method for material design using a prediction model and optimization calculation to reduce the workload for designing non-metal materials.

CITATION LIST

Patent Literature

PTL 1: JP 5953952 B2
PTL 2: JP 4772932 B2
PTL 3: JP 4476923 B2
PTL 4: JP 4393586 B2

SUMMARY

Technical Problem

The known techniques in PTL 1 to 3, however, have the following problems. With the methods disclosed in PTL 1 to 3, a steel plate having the desired crystal grain and hardness is produced by a combination of heating, hot rolling, accelerated cooling, and heat treatment. Experimental results on the laboratory level and performance data from actual machines are used to formulate the guidelines for organizational design semi-empirically in these methods of producing a steel plate. Accordingly, the desired steel material cannot always be obtained if some sort of disturbance (such as variation in the chemical composition, dimensions, or temperature) occurs during production. In the case of newly producing high-grade steel material with greater strength, ductility, and thickness, experiments on the laboratory level and trial production on actual machines need to be repeated to obtain the corresponding guidelines. Furthermore, the method disclosed in PTL 4 makes no mention of producing metal materials, and no consideration is given to resistance against disturbances during production.

In light of these considerations, the present disclosure aims to provide a production specification determination method, a production method, and a production specification determination apparatus that can increase robustness against disturbances during production of a metal material.

Solution to Problem

A production specification determination method according to an embodiment of the present disclosure for solving the aforementioned problem includes:
  acquiring at least one piece of performance data established after a predetermined process during production of a metal material; and
  performing back analysis based on the at least one piece of performance data and a prediction model that relates production specifications and material characteristics, and searching for production specifications for after the predetermined process such that an estimated value for the material characteristics asymptotically approaches a desired value.

A production method according to an embodiment of the present disclosure is for producing a metal material to production specifications determined using the aforementioned production specification determination method.

A production specification determination apparatus according to an embodiment of the present disclosure includes:

a communication interface configured to acquire at least one piece of performance data established after a predetermined process during production of a metal material; and a search processor configured to perform back analysis based on the at least one piece of performance data and a prediction model that relates production specifications and material characteristics, and search for production specifications for after the predetermined process such that an estimated value for the material characteristics asymptotically approaches a desired value.

Advantageous Effect

The production specification determination method, production method, and production specification determination apparatus for a metal material according to embodiments of the present disclosure can increase robustness against disturbances during production.

BRIEF DESCRIPTION OF THE DRAWINGS

In the accompanying drawings:

FIG. 7 illustrates example prediction results obtained by back analysis; and

DETAILED DESCRIPTION

Embodiments

Embodiments of the present disclosure are described below.

Figure 1:
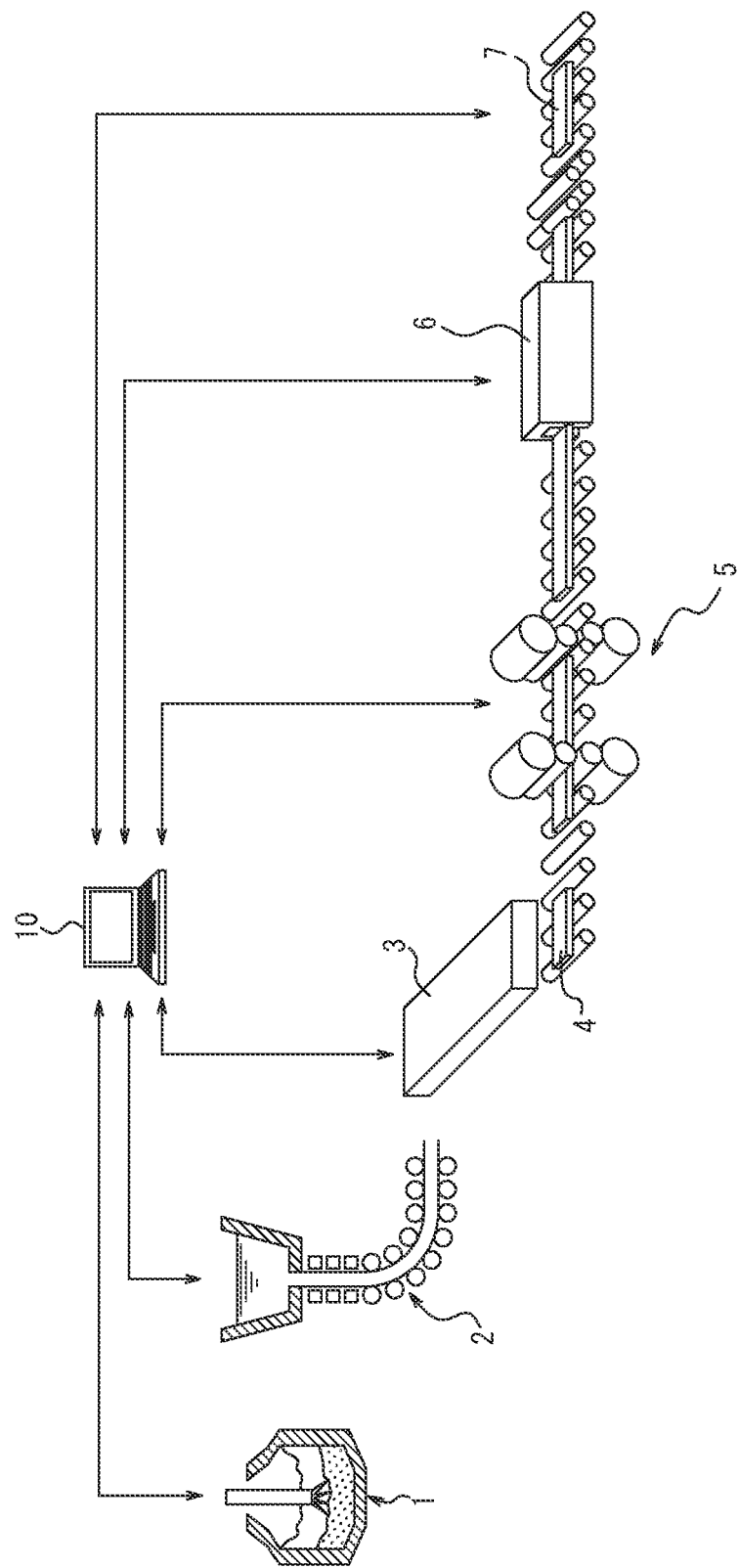
FIG. 1 is a schematic diagram illustrating the overall configuration of a system that includes a production specification determination apparatus according to an embodiment of the present disclosure.

FIG. 1 is a schematic drawing illustrating the overall configuration of a system that includes a production specification determination apparatus 10 according to an embodiment of the present disclosure. The metal material that is the design target is a steel plate in the example described in the present embodiment, but the metal material is not limited to being a steel plate. The system according to the present embodiment illustrated in FIG. 1 includes a converter 1, a continuous casting machine 2, a heating furnace 3, a steel plate 4, a mill 5, an accelerated cooling apparatus 6, a finished product steel plate 7, and the production specification determination apparatus 10. During the production process of the steel plate, raw iron ore is first charged into a blast furnace together with limestone and coke to generate molten pig iron. Components, such as carbon, of the pig iron produced in the blast furnace are adjusted in the converter 1, and final component adjustment is performed by secondary refining. In the continuous casting machine 2, an intermediate material referred to as continuous-cast steel (slab) is produced by casting the refined steel. Subsequently, the slab is heated by a heating process in the heating furnace 3 and subsequently subjected to a hot rolling process in the mill 5 and a cooling process in the accelerated cooling apparatus 6 to yield the finished product steel plate 7. After the cooling process, treatments such as pickling, cold rolling, healing, and plating may be performed as appropriate.

In overview, the production specification determination apparatus 10 according to the present system optimizes various production specifications during production of the steel plate. Optimization of production specifications includes chemical composition adjustment with the converter 1, adjustment of the slab dimensions, casting rate, and secondary cooling with the continuous casting machine 2, adjustment of the slab heating temperature, slab in-furnace time, and slab extraction temperature with the heating furnace 3, adjustment of the finished product dimensions, rolling conditions, and temperature conditions with the mill 5, and adjustment of cooling with the accelerated cooling apparatus 6. The production specification determination apparatus 10 performs back analysis based on at least one piece of performance data, established after a predetermined process, and a prediction model and derives estimated values for material characteristics of the finished product steel plate 7 after cooling. The production specification determination apparatus 10 performs feedforward calculation of the necessary control amount so that the estimated values asymptotically approach the required material characteristics (desired values) and provides instruction values to the converter 1, the continuous casting machine 2, the heating furnace 3, the mill 5, and the accelerated cooling apparatus 6. In other words, the production specification determination apparatus 10 according to an embodiment of the present disclosure acquires at least one piece of performance data established after a predetermined process during production of a metal material, performs back analysis based on the at least one piece of performance data and a prediction model, and optimizes production specifications for after the predetermined process such that an estimated value for the material characteristics asymptotically approaches a desired value. For example, the predetermined process may be a secondary refining process, and the at least one piece of performance data may be performance data for chemical composition adjustment by the converter 1. The material characteristics may, for example, include the uniform elongation of the metal material. By inclusion of the uniform elongation, the production specification determination apparatus 10 can, for example, be used to satisfy the requirement on shock energy absorption to guarantee the structural safety of a structure with respect to external forces. The material characteristics may, for example, include at least one selected from the group consisting of yield point, tensile stress, toughness value, surface hardness, and cross-sectional hardness to satisfy desired steel plate standards.

Figure 2:
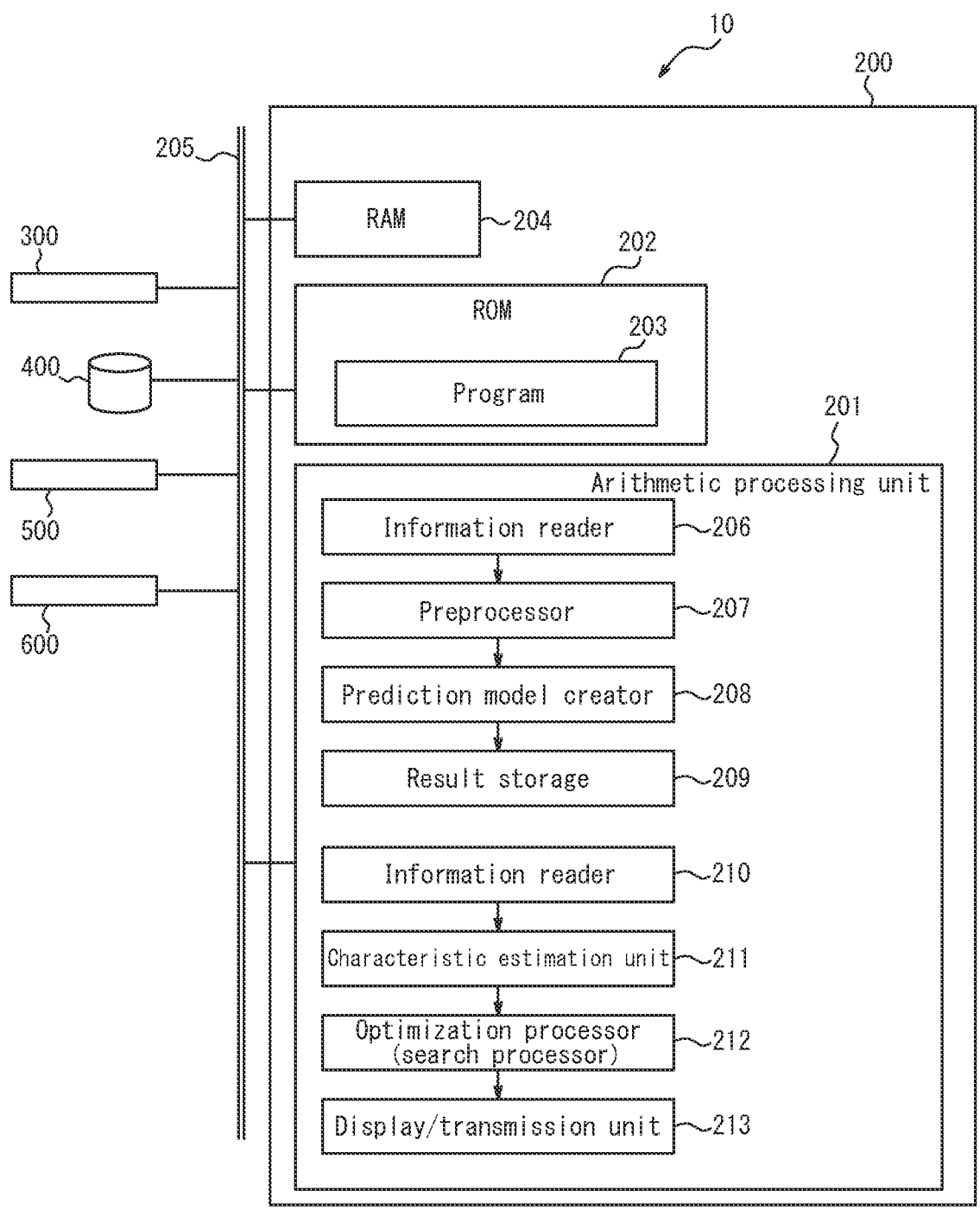
FIG. 2 is a block diagram illustrating the production specification determination apparatus according to an embodiment of the present disclosure.

FIG. 2 is a block diagram illustrating the production specification determination apparatus 10 according to an embodiment of the present disclosure. The production specification determination apparatus 10 optimizes production specifications by performing material characteristic estimation processing on a steel plate. The production specification determination apparatus 10 includes an apparatus body 200, an input interface 300, a memory 400, an output interface 500, and a communication interface 600. The apparatus body 200 transmits and receives necessary information by communicating over a bus 205 with the input interface 300, the memory 400, the output interface 500, and the communication interface 600 and performs information processing. In FIG. 2, the apparatus body 200 is connected to the 10) input interface 300, the memory 400, the output interface 500, and the communication interface 600 over the bus 205 in a wired manner, but this configuration is not limiting. The connection may be wireless or a combination of wired and wireless. Details on the configurations of the apparatus body 200 are provided below.

The input interface 300 includes any interface for input that can detect operations by the administrator of the present system, such as a keyboard, a pen tablet, a touchpad, a mouse, or the like. The input interface 300 receives operations pertaining to instructions for the apparatus body 200 for various processing.

The memory 400 is, for example, a hard disk drive, a semiconductor drive, an optical disk drive, or the like and is an apparatus that stores information necessary for the present system. For example, the memory 400 stores performance values of production specifications pertaining to steel plates produced in the past (production specification performance). The memory 400 stores performance values of material characteristics of steel plates after cooling (material characteristic performance), which correspond to the production specification performance.

The output interface 500 includes any appropriate display, such as a liquid crystal display or an organic EL display. The output interface 500 can display screens based on output data and signals.

The communication interface 600 receives performance data transmitted from the converter 1, the continuous casting machine 2, the heating furnace 3, the mill 5, and the accelerated cooling apparatus 6 and outputs the performance data to the apparatus body 200. The communication interface 600 transmits data pertaining to optimized production specifications, outputted by the apparatus body 200, to the converter 1, the continuous casting machine 2, the heating furnace 3, the mill 5, and the accelerated cooling apparatus 6.

The apparatus body 200 illustrated in FIG. 2 includes an arithmetic processing unit 201, a ROM 202, and a RAM 204. The ROM 202 stores a program 203. The arithmetic processing unit 201, the ROM 202, and the RAM 204 are connected to each other by the bus 205.

The arithmetic processing unit 201 includes one or more processors, such as a general purpose processor, a dedicated processor specialized for particular processing, and the like. The arithmetic processing unit 201 reads a program 203 from the ROM 202 and uses the RAM 204, which is a temporary storage, to implement particular functions. The arithmetic processing unit 201 controls operations of the apparatus body 200 overall.

The arithmetic processing unit 201 includes an information reader 206, a preprocessor 207, a prediction model creator 208, a result storage 209, an information reader 210, a characteristic estimation unit 211, an optimization processor 212, and a display/transmission unit 213. Upon receiving an instruction for prediction model creation processing based on operation of the input interface 300, the arithmetic processing unit 201 causes the information reader 206, the preprocessor 207, the prediction model creator 208, and the result storage 209 to function and creates a prediction model. Upon receiving an instruction for estimation processing based on operation of the input interface 300, the arithmetic processing unit 201 causes the information reader 210, the characteristic estimation unit 211, the optimization processor 212, and the display/transmission unit 213 to function and executes processing to optimize production specifications. The optimization processor is also referred to as a search processor that searches for a solution by optimization processing.

Figure 3:
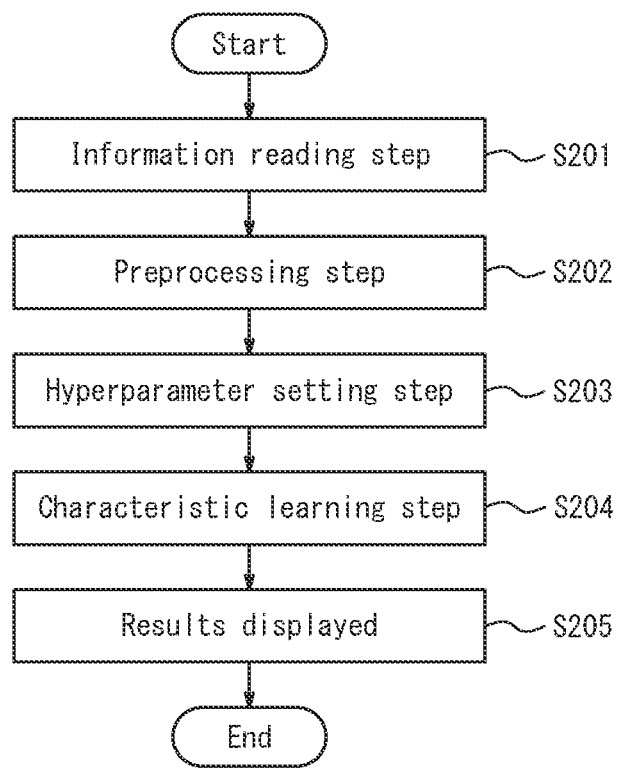
FIG. 3 is a flowchart of a process for creating a prediction model according to an embodiment of the present disclosure.

Next, the information processing executed by the production specification determination apparatus 10 according to an embodiment of the present disclosure is described. To optimize the production specifications of a steel plate in the present system, a prediction model that relates material characteristics of steel plates and production specifications is first created. Here, a neural network model is created as the prediction model in the present embodiment. FIG. 3 illustrates a flowchart for prediction model creation processing. Upon receiving an instruction for prediction model creation processing based on operation of the input interface 300, the arithmetic processing unit 201 executes the processing of the flowchart in FIG. 3.

When the prediction model creation instruction is received, the information reader 206 of the arithmetic processing unit 201 reads the production specification performance from the memory 400. The information reader 206 also reads the material characteristic performance corresponding to the read production specification performance from the memory 400. Specifically, the information reader 206 identifies various pieces of information pertaining to a steel plate based on a rolled material ID (step S201).

Next, the preprocessor 207 processes the production specification performance inputted in step S201 for the prediction model creation processing (step S202). Specifically, the preprocessor 207 normalizes the production specification performance between 0 and 1 and removes the noise of missing data and abnormal data.

Subsequently, the prediction model creator 208 creates a prediction model. Specifically, the prediction model creator 208 sets hyperparameters used in the neural network model (step S203) and uses these hyperparameters for learning with the neural network model (step S204).

To optimize the hyperparameters, the prediction model creator 208 first creates a neural network model, in which several of the hyperparameters are changed in stages, for training data (approximately several tens of thousands of pieces of production specification performance). The prediction model creator 208 then sets hyperparameters such that the prediction accuracy is highest for verification data.

The hyperparameters include, but are not limited to, the number of hidden layers, the number of neurons in each hidden layer, the dropout rate (blocking of neuronal transmission with a certain probability) in each hidden layer, and an activation function in each hidden layer. The method for optimizing hyperparameters is not particularly restricted. A grid search that changes parameters in stages, a random search that randomly selects parameters, or searching by Bayesian optimization may be used.

Figure 4:
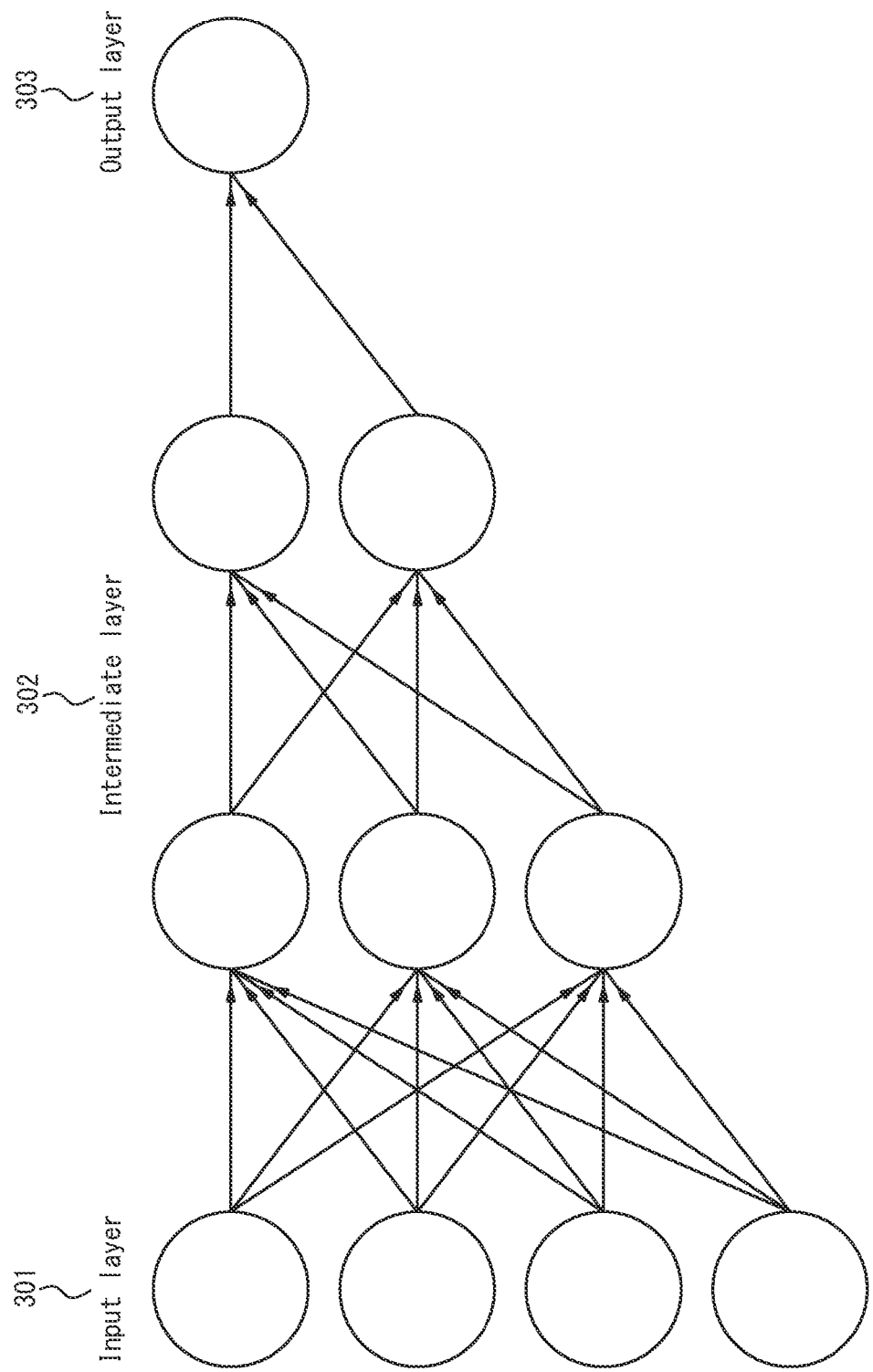
FIG. 4 is a diagram illustrating an overview of a neural network model.

FIG. 4 illustrates the processing flow of the neural network model in the present system. The neural network model according to the present embodiment includes an input layer 301, an intermediate layer 302, and an output layer 303 in order from the input side.

Production specification performance normalized between 0 and 1 is stored in the input layer 301. Variables related to material characteristics of the steel plate are preferably selected as explanatory variables of the stored production specification performance, but the number thereof and the height of the correlation with material characteristics may be freely set.

The intermediate layer 302 includes one or more hidden layers, and a certain number or greater of neurons are arranged in each hidden layer. The number of hidden layers configuring the intermediate layer 302 is not particularly restricted, but experience indicates that too many hidden layers reduces prediction accuracy. The number of hidden layers is therefore preferably 10 or less. The number of neurons arranged in each hidden layer is preferably within a range of 1 to 20 times the number of inputted explanatory variables.

Transmission from a certain neuron to a neuron in the following hidden layer takes place through weighting of variables with weighting factors and through an activation function. A sigmoid function, a hyperbolic tangent function, or a ramp function may be used as the activation function.

In the output layer 303, neuron information transmitted from the intermediate layer 302 is combined and outputted as an estimated value of the final material characteristics. Learning is performed by gradual optimization of the weighting factors in the neural network model based on the estimated value outputted by this processing and the actual material characteristic performance, which is a measured value.

After the weighting factors of the neural network model are learned, the prediction model creator 208 inputs evaluation data created in step S202 to the neural network model to obtain estimation results for the evaluation data.

Subsequently, the result storage 209 stores training data, the evaluation data, the parameters of the neural network model, and the output results of the neural network model for the training data and the evaluation data in the memory 400. The result storage 209 also transmits the training data, the evaluation data, the parameters of the neural network model, and the output results of the neural network model for the training data and the evaluation data to the output interface 500 and displays these via the output interface 500 (step S205). The output interface 500 outputs estimation results in table format, for example.

Figure 5:
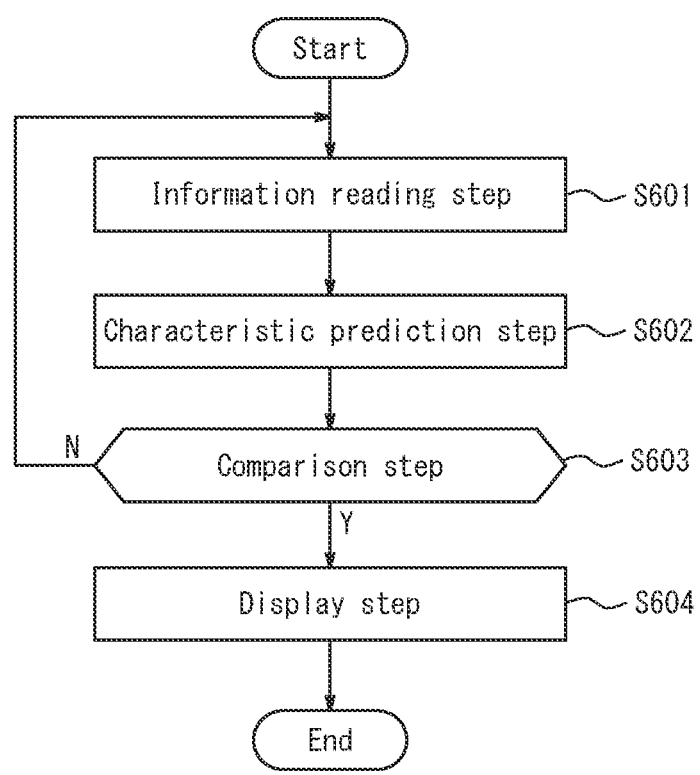
FIG. 5 is a flowchart illustrating optimization processing according to an embodiment of the present disclosure.

Upon receiving an instruction for processing to optimize production specifications based on operation of the input interface 300, the arithmetic processing unit 201 executes the processing to optimize production 10) specifications. The trigger for the arithmetic processing unit 201 to execute the optimization processing is not limited to operation of the input interface 300. For example, the arithmetic processing unit 201 may execute the optimization processing in response to receipt, by the communication interface 600, of at least one piece of performance data established after a predetermined process. FIG. 5 is a flowchart illustrating the processing to optimize production specifications.

First, the information reader 210 reads production specifications established in advance before the optimization processing, and at least one piece of performance data established after a predetermined process, for a steel plate to be subjected to estimation (step S601). The information reader 210 also acquires various data, pertaining to the neural network model, stored in the memory 400.

Next, the characteristic estimation unit 211 performs back analysis using the production specifications read in step S601, the at least one piece of performance data established after the predetermined process, read in step S601, and the prediction model, and optimizes the production specifications. Specifically, the characteristic estimation unit 211 estimates the material characteristics after rolling for the steel plate (step S602). Subsequently, the optimization processor 212 compares the estimated value, estimated by the prediction model, of the material characteristics after rolling for the steel plate with the target value (desired value) of the material characteristics (step S603). When the absolute value of the difference between the estimated value and the desired value is a certain threshold or greater, or is less than a certain number of convergences, the optimization processor 212 changes a portion of the production specifications read in step S601 and again estimates the material characteristics with the prediction model in step S602. During the optimization processing, these processes are repeated to search for optimized production specifications. The optimization method is not particularly restricted. For example, a constrained least squares method or the like may be used.

By this repeated performance of back analysis using at least one piece of performance data established after a predetermined process, more appropriate production specifications yielded by readjustment of the original production specifications can be obtained.

The production specifications are changed within the preferred ranges described below, but process constraints are also taken into consideration. Examples include slab thickness >finished product thickness, and slab heating temperature >rolling entry steel plate temperature >steel plate temperature during rolling >rolling finishing temperature >cooling entry temperature >cooling exit temperature. However, any constraints that are consistent in the manufacturing process may be adopted.

When the absolute value of the difference between the estimated value and the desired value is within a certain threshold, or reaches a certain number of convergences, then step S603 is skipped, and the optimized production specifications are displayed by the output interface 500 (step S604). The optimized production specifications are transmitted via the communication interface 600 to the processes, among the converter 1, the continuous casting machine 2, the heating furnace 3, the mill 5, and the accelerated cooling apparatus 6, that are after the predetermined process. The steel plate is then produced with the optimized production specifications.

Next, the production specifications transmitted from the production specification determination apparatus 10 during material characteristic estimation of the present disclosure are specifically described. The explanation below pertains to an embodiment of the present disclosure, and the present disclosure is in no way limited to the explanation below.

[Chemical Composition]

The steel material used to produce a steel plate of the present disclosure has the following chemical composition, for example.

In mass %,
C: 0.05% to 0.16%,
Si: 0.10% to 0.50%,
Mn: 0.80% to 2.50%,
P: 0.05% or less,
S: 0.02% or less,
Cu: 1.0% or less,
Ni: 2.0% or less,
Cr: 1.0% or less, Mo: 1.0% or less,
Nb: 0.1% or less,
V: 0.1% or less,
Ti: 0.1% or less,
B: 0.005% or less,
Ca: 0.005% or less, and
W: 0.05% or less.

The reasons for limitations on the content of each component in the aforementioned chemical composition are explained below. Note that the unit "%" in the explanation below represents "mass %" unless otherwise specified.

C: 0.05 to 0.16%

C is an element that has the effect of increasing the hardness of the matrix and improving the strength. In order to produce such an effect, the C content needs be 0.05% or more. If the C content exceeds 0.16%, however, the hardness of the matrix rises excessively, and elongation deteriorates. The C content is therefore set to 0.16% or less. The C content is preferably 0.07% to 0.15%.

Si: 0.10% to 0.50%

Si is an element that functions as a deoxidizer and that dissolves in steel to further increase the hardness of the matrix by solid solution strengthening. In order to produce such an effect, the Si content needs be 0.10% or more. If the Si content exceeds 0.50%, however, the hardness of the matrix rises excessively, the ductility and toughness degrade, and the amount of inclusions that become the initiation point of voids that accompany local deformation increases. The Si content is therefore set to 0.50% or less. The Si content is preferably 0.20% to 0.40%.

Mn: 0.80% to 2.50%

Mn is an element that has the effect of increasing the hardness of the matrix and improving the strength. In order to produce such an effect, the Mn content needs be 0.80% or more. If the Mn content exceeds 2.50%, however, the weldability degrades, and the hardness of the matrix also rises excessively. Accordingly, the Mn content is set to 2.50% or less. The Mn content is preferably 1.00% to 2.30%.

P: 0.05% or Less

P is an element included in steel as an inevitable impurity. P segregates at the grain boundary and has adverse effects such as reducing the toughness of the base metal and the welded portion. Accordingly, the amount of P is preferably reduced insofar as possible, but a content of 0.05% or less is tolerable. The P content is therefore set to 0.05% or less. While no lower limit is set for the P content, excessive reduction leads to a rise in refining costs. Accordingly, the P content is preferably 0.001% or more.

S: 0.02% or Less

S is an element included in steel as an inevitable impurity. S is an element present in steel as a sulfide inclusion, such as MnS, and has adverse effects such as becoming the initiation point of destruction. Therefore, the amount of S is preferably reduced insofar as possible, but a content of 0.02% or less is tolerable. The S content is therefore set to 0.02% or less. The S content is preferably 0.01% or less. While no lower limit is set for the S content, excessive reduction leads to a rise in refining costs. Accordingly, the S content is preferably 0.0005% or more.

Cu: 1.0% or Less

Cu is an element that increases the hardness of the matrix and has the effect of improving atmospheric corrosion resistance of the steel plate. Cu may be freely added in accordance with desired characteristics. If the Cu content exceeds 1.0%, however, weldability is impaired, and flaws occur more easily during steel material production. Accordingly, when Cu is added, the amount is set to 1.0% or less. The Cu content is more preferably 0.01% to 0.8%.

Ni: 2.0% or Less

Ni is an element that has the effects of improving low-temperature toughness and atmospheric corrosion resistance, and also of suppressing hot brittleness when Cu is added. Ni may be added freely in accordance with desired characteristics. If the Ni content exceeds 2.0%, however, weldability is impaired, and steel material costs increase. Accordingly, when Ni is added, the amount is set to 2.0% or less. The Ni content is more preferably 0.01% to 1.5%.

Cr: 1.0% or Less

Cr is an element that increases the hardness of the matrix and has the effect of improving atmospheric corrosion resistance. Cr may be freely added in accordance with desired characteristics. If the Cr content exceeds 1.0%, however, weldability and toughness are impaired. Accordingly, when Cr is added, the amount is set to 1.0% or less. The Cu content is more preferably 0.01% to 0.8%.

Mo: 1.0% or Less

Mo is an element that increases the hardness of the matrix and may be freely added in accordance with desired characteristics. If the Mo content exceeds 1.0%, however, weldability and toughness are impaired. Accordingly, when Mo is added, the amount is set to 1.0% or less. The Mo content is more preferably 0.001% to 0.8%.

Nb: 0.1% or Less

Nb is an element that has the effect of suppressing recrystallization of austenite and refining austenite at the time of hot rolling, along with improving strength by precipitating during the air cooling process after hot rolling. Nb may be added freely in accordance with desired characteristics. If the Nb content exceeds 0.1%, however, a large amount of NbC precipitates, and toughness is impaired. Accordingly, when Nb is added, the amount is set to 0.1% or less. The Nb content is more preferably 0.001% to 0.08%.

V: 0.1% or Less

Like Nb, V is an element that has the effect of suppressing recrystallization of austenite and refining austenite at the time of hot rolling, along with improving strength by precipitating during the air cooling process after hot rolling. V may be added freely in accordance with desired characteristics. If the V content exceeds 0.1%, however, a large amount of VC precipitates, and toughness is impaired. Accordingly, when V is added, the amount is set to 0.1% or less. The V content is more preferably 0.001% to 0.08%.

Ti: 0.1% or Less

Ti has a strong tendency to form nitrides, thereby fixing N and reducing the amount of solute N. Ti therefore has the effect of improving the toughness of the base metal and the welded portion. When Ti is added along with B, the Ti fixes N, which can suppress the precipitation of B as BN. Consequently, Ti can further increase strength by promoting the effect that B has of improving hardenability. Ti may therefore be freely added in accordance with desired characteristics. If the Ti content exceeds 0.1%, however, a large amount of TiC precipitates, and toughness is impaired. Accordingly, when Ti is added, the amount is set to 0.1% or less. The Ti content is more preferably 0.001% to 0.08%.

B: 0.005% or Less

B is an element that has the effects of dramatically improving the hardenability, even when only a small amount is added, and increasing the strength. B may be added in accordance with the desired characteristics. A content of B exceeding 0.005%, however, fails to increase these effects and results in degraded weldability. Accordingly, when B is added, the amount is set to 0.005% or less. The B content is more preferably 0.0001% to 0.004%.

Ca: 0.005% or Less

Ca bonds with S, suppressing the formation of MnS or the like, which expands greatly in the rolling direction. Ca thus exerts morphological control so that sulfide inclusions become spherical, contributing to the improved toughness of the welded portion and the like. Ca may therefore be added in accordance with desired characteristics. A Ca content exceeding 0.005%, however, fails to increase these effects and results in degraded cleanliness of the steel and numerous surface defects, thereby degrading the surface characteristics. Accordingly, when Ca is added, the amount is set to 0.005% or less. The Ca content is more preferably 0.0001% to 0.004%.

W: 0.05% or Less

W increases the hardness of the matrix and improves atmospheric corrosion resistance. W may therefore be added in accordance with desired characteristics. A W content exceeding 0.05%, however, leads to degraded weldability or an increase in the alloy cost. Accordingly, when W is added, the amount is set to 0.05% or less. The W content is more preferably 0.0001% to 0.03%.

The chemical composition of the rolled steel plate in the present disclosure includes the aforementioned components, with the balance being Fe and inevitable impurities. When oxygen (O) and N are included as inevitable impurities, the O content is preferably kept to 0.0050% or less, and the N content is preferably kept to 0.0050% or less. If the O content exceeds 0.0050%, the proportion of inclusions present on the steel plate surface increases. Cracks initiating at inclusions may therefore occur more easily, and elongation may deteriorate. Similarly, if the N content exceeds 0.0050%, the proportion of inclusions present on the steel plate surface increases. Cracks initiating at inclusions may therefore occur more easily.

[Plate Thickness]

The "steel plate" in the present disclosure refers to a steel plate with a thickness of 6 mm or more, in accordance with the regular definition in the present technical field. The cross-sectional area and cross-sectional shape of the produced steel material are not, however, particularly restricted. The produced steel material may be a thin sheet and may be shaped steel, a rod, or a pipe shape.

[Production Method]

In an embodiment of the present disclosure, the following treatments are sequentially performed on steel material with the above-described chemical composition to yield a steel plate.

(1) Converter/refining
(2) Continuous casting
(3) Heating
(4) Hot rolling
(5) Cooling

[Converter/Refining]

The above-described composition is achieved by adjustments using a conventional method in the molten steel stage until the start of casting. For example, each alloying element is included in the steel by being added to the molten steel during the converter process and/or the secondary refining process. At that time, pure metal and/or alloys can be used.

[Continuous Casting]

The molten steel adjusted in the aforementioned converter process and/or secondary refining process is formed into a slab by continuous casting using a vertical-bending-type or curved-type continuous casting machine. At this time, the cooling conditions of secondary cooling equipment and the casting rate are changed to form a slab with the desired temperature/shape.

[Heating]

A slab having the aforementioned chemical composition is heated at a temperature 900° C. to 1200° C. If the heating temperature is less than 900° C., the deformation resistance of the slab in the following hot rolling process increases, and the load on the hot rolling machine increases, making hot rolling difficult. The heating temperature is therefore set to 900° C. or more. The heating temperature is preferably set to 950° C. or more. If the heating temperature exceeds 1200° C., however, not only do the crystal grains in the middle portion of the steel plate coarsen, degrading the toughness, but oxidation of the slab surface also becomes significant, and unevenness at the steel substrate-scale interface becomes sharp. Accordingly, surface roughness tends to remain in the finished product as well. Such surface roughness might become the initiation point of ductile fracture due to stress concentration. The heating temperature is therefore set to 1200° C. or less. The heating temperature is preferably 1150° C. or less. When a slab is produced by a method such as continuous casting, the slab may be subjected directly to the heating process without being cooled or may be subjected to the heating process after being cooled. The heating method is not particularly restricted. For example, the slab may be heated in a heating furnace in accordance with a conventional method.

[Hot Rolling]

Next, the heated slab is subjected to hot rolling to yield a steel plate. At this time, to ensure the toughness that is the basic performance of a steel plate, the ferrite grains need to be refined by refinement of austenite grains in the middle portion of the steel plate. The cumulative rolling reduction in the hot rolling is therefore set to 50% or more. In other words, when the cumulative rolling reduction is less than 50%, the ferrite grains are not refined in the middle portion of the steel plate, areas with low brittleness occur locally, and brittle cracks occur more easily. Other conditions related to the hot rolling process are not particularly restricted.

[Cooling]

Next, the steel plate is cooled after the hot rolling is complete. During the cooling process, the steel plate is preferably cooled to room temperature. The cooling may be performed by any appropriate method, such as air cooling or accelerated cooling.

EXAMPLES

The advantageous effects of the present disclosure are described below in detail based on examples, but the present disclosure is not limited to these examples.

In the system according to the present embodiment, the product plate thickness was 15 mm, and production specifications for a steel plate exhibiting excellent uniform elongation were optimized. As pre-learning, training data was first used for learning by the neural network model, and the production specification performance and material characteristic performance were linked.

As production specification performance, information on the chemical composition (C, Si, Mn, P, S, Ni, Cr, V, Ti, Nb), the slab dimensions (thickness, width, length), the rolling dimensions (thickness, width, length), the slab heating temperature, the rolling reduction during controlled rolling, the controlled rolling temperature, the rolling finish temperature, and the cooling rate after rolling was considered. For the material characteristic performance, tensile tests were conducted using JIS Z 2201 1B full-thickness test pieces sampled from the widthwise central region of the steel plate after cooling, with the plate transverse direction matching the tensile direction. The yield point (YS) and the total thickness elongation were calculated and supplied for learning. A total of 470 samples, with noise such as missing data removed, were used as the number of pieces of training data. The hyperparameters used in the neural network were searched for by Bayesian optimization based on a Gaussian probability distribution and were set as follows.

Number of epochs (number of repetitions of learning): 813

Number of neurons in hidden layer: 328

Dropout ratio (probability of blocked neuronal transmission): 0.3

Number of hidden layers: 8

Optimization method of weighting factors for learning: Adam

Figure 6:
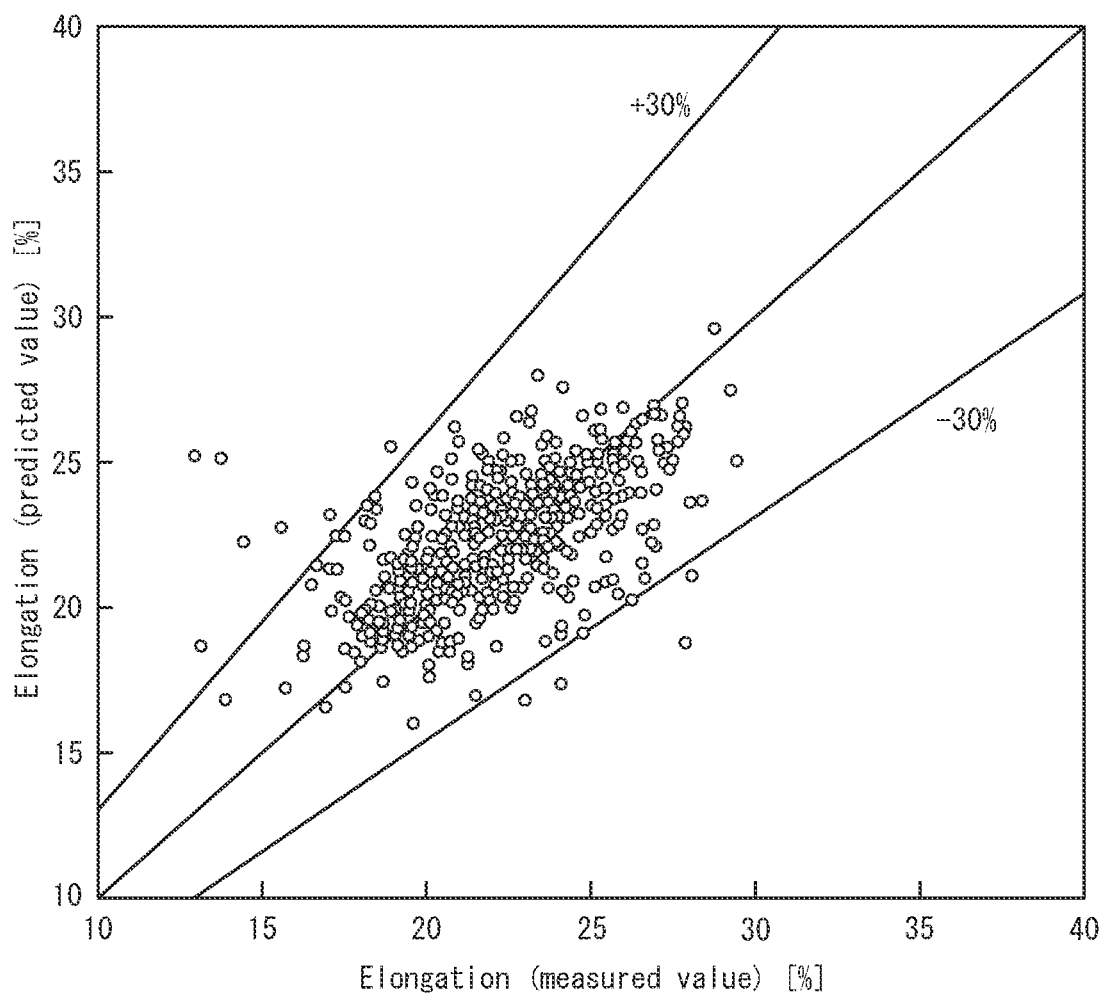
FIG. 6 is a graph illustrating prediction accuracy.

FIG. 6 illustrates a graph of prediction accuracy. The learning accuracy was verified by cross validation. The model prediction error was o 2.44%. Achievement of a tensile strength of at least 440 MPa was set as a target material characteristic. The target elongation was 30%.

In the present Example, the material characteristics were estimated with the neural network model for a steel slab with a previously established chemical composition and slab size, and the necessary control amount was calculated for subsequent processes from the heating furnace onward, so that the estimated material characteristics asymptotically approached the target material characteristics. Specifically, the difference between the estimated value and the target value was calculated for each of the yield point and the total thickness elongation, and calculations were made using a sequential least squares method so that the sum of the two differences was minimized. The number of repetitions until convergence was set to 500. Each explanatory variable sought by calculation was provided to the heating furnace 3, the mill 5, and the accelerated cooling apparatus 6 as an instruction value.

The product plate thickness in the Comparative Examples was also 15 mm, and rolling was performed in the same way as in the Example, except that steel was produced within preferred ranges without the use of a neural network model.

Figure 8:
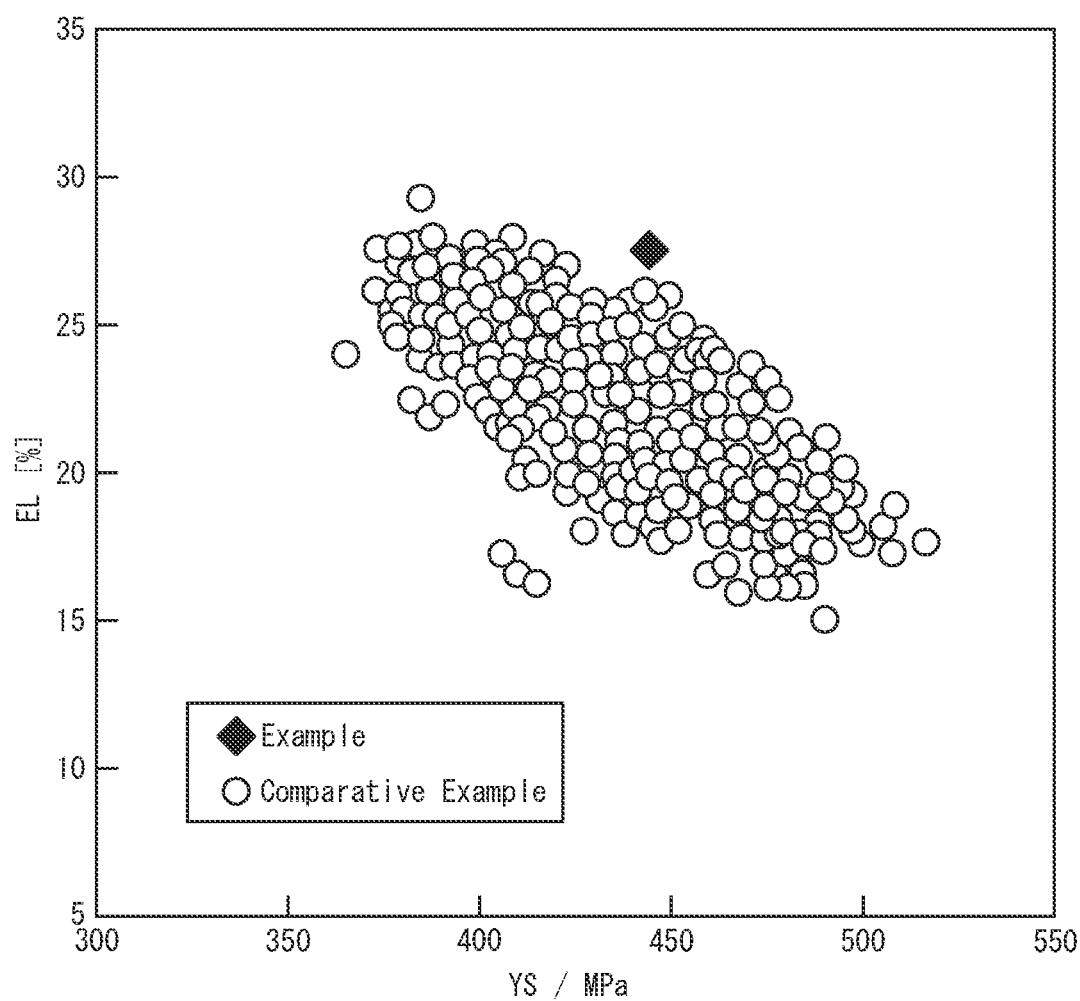
FIG. 8 is a graph illustrating a comparison between an Example and Comparative Examples.

FIG. 7 illustrates the upper and lower limits of the explanatory variables and the prediction results obtained by back analysis in the Example. In FIG. 7, the slab thickness, the slab width, the slab length, and the chemical composition (C, Si, Mn, P, S, Ni, Cr, V, Ti) correspond to at least one piece of performance data established after a predetermined process during production. Based on the performance data, the other production specifications, i.e., rolling thickness, rolling width, rolling length, heating furnace temperature, rolling reduction at the time of controlled rolling, controlled rolling temperature, rolling finish temperature, and cooling rate, were optimized to readjust the production specifications. As a result of optimization, the maximum elongation in the range of the upper and lower limits of the explanatory variables was estimated at 26.9%. FIG. 8 illustrates the relationship between yield point (YS) and uniform elongation (EL) at the time of actual production with the optimized production specifications obtained by back analysis. A steel plate with a higher uniform elongation than the Comparative Examples, while maintaining the yield point, was obtained by using the method of the present Example.

According to the production specification determination method in an embodiment of the present disclosure, the production guidelines for a steel plate with high uniform elongation and excellent collision resistance can be predicted accurately, and a steel plate with the target material characteristics can be produced, as indicated by the Example. This can greatly contribute to improving productivity and improving the development speed of steel material. Since the production specifications are optimized using at least one piece of performance data established after a predetermined production process, production specifications that take into account changing conditions during the production process can be obtained even when disturbances occur during the production process. In other words, the production specification 20 determination method according to an embodiment of the present disclosure can increase robustness against disturbances during production of metal material. Furthermore, the production specification determination method according to an embodiment of the present disclosure enables production of a steel plate having target material characteristics without the trial and error of repeated experiments and trial production on actual machines. This can greatly contribute to improving productivity and improving the development speed of steel material. Accordingly, the production specification determination method in an embodiment of the present disclosure can suitably be used in steel plates with excellent collision resistance, in particular in welded structures for which structural safety is strongly required, such as ships, marine structures, bridges, buildings, tanks, and construction machinery.

Although the matter of the present disclosure has been explained with reference to the accompanying drawings and examples, it is to be noted that various changes and modifications will be apparent to those of ordinary skill in the art based on the present disclosure. Therefore, such changes and modifications are to be understood as included within the scope of the present disclosure. For example, the functions and the like included in the various means and steps may be reordered in any logically consistent way. Furthermore, means and steps may be combined into one or divided.

For example, the present disclosure may also be embodied as a program containing a description of the processing for achieving the functions of the above-described production specification determination apparatus 10 or a storage medium with the program recorded thereon. These embodiments are also to be understood as included in the scope of the present disclosure.

Examples of creating prediction models in the production specification determination apparatus 10 according to the present embodiment have been described, but these prediction models may be implemented by another information processing apparatus. In this case, the information processing apparatus collects the production specification performance and material characteristic performance necessary for creating the prediction model and then creates the prediction model. The information processing apparatus transmits the created mathematical model to the production specification determination apparatus 10.

A neural network has been adopted as the algorithm for creating a prediction model in the production specification determination apparatus 10 according to the present embodiment, but this example is not limiting. Any appropriate algorithm can be adopted. For example, statistical methods and machine learning methods such as local regression, a support vector machine, a neural network, a random forest, or the like can be adopted as the algorithm for creating a prediction model. In other words, the prediction model may be a machine learning model including a deep learning model or a statistical learning model, that is trained based on performance data for product specifications and material characteristics.

REFERENCE SIGNS LIST

1 Converter
2 Continuous casting machine
3 Heating furnace
4 Steel plate
5 Mill
6 Accelerated cooling apparatus
7 Finished product steel plate
10 Production specification determination apparatus
200 Apparatus body
201 Arithmetic processing unit
202 ROM
203 Program
204 RAM
205 Bus
206 Information reader
207 Preprocessor
208 Prediction model creator
209 Result storage
210 Information reader
211 Characteristic estimation unit
212 Optimization processor (search processor)
213 Display/transmission unit
300 Input interface
301 Input layer
302 Intermediate layer
303 Output layer
400 Memory
500 Output interface
600 Communication interface

The invention claimed is:

1. A production specification determination method for a metal material, the production specification determination method comprising:
acquiring, as a portion of production specifications, at least one piece of performance data established after a predetermined process during production of a metal material; and
performing back analysis based on the at least one piece of performance data and a prediction model that relates the production specifications including the at least one piece of performance data and material characteristics, and optimizing, during production, production specifications for after the predetermined process by performing feedforward calculation of control amount of a process after the predetermined process in an entire production process and transmitting the control amount to the process as an instruction value such that an estimated value for the material characteristics approaches a desired value.

2. The production specification determination method of claim 1, wherein the predetermined process is a process for adjusting a chemical composition of the metal material, and the at least one piece of performance data comprises performance data on chemical composition adjustment.

3. The production specification determination method of claim 1, wherein the metal material is a steel plate.

4. The production specification determination method of claim 1, wherein the material characteristics comprise uniform elongation.

5. The production specification determination method of claim 1, wherein the prediction model is a machine learning model including a deep learning model or a statistical learning model, trained based on the production specifications and performance data of the material characteristics.

6. A production method for producing a metal material to production specifications determined using the production specification determination method of claim 1.

7. A production specification determination apparatus comprising:
a communication interface configured to acquire, as a portion of production specifications, at least one piece of performance data established after a predetermined process during production of a metal material; and
a search processor configured to perform back analysis based on the at least one piece of performance data and a prediction model that relates the production specifications including the at least one piece of performance data and material characteristics, and optimize, during production, production specifications for after the predetermined process by performing feedforward calculation of control amount of a process after the predetermined process in an entire production process and transmitting the control amount to the process as an instruction value such that an estimated value for the material characteristics approaches a desired value.

* * * * *